United States Patent
Yu et al.

(10) Patent No.: US 10,146,627 B2
(45) Date of Patent: *Dec. 4, 2018

(54) MOBILE FLASH STORAGE BOOT PARTITION AND/OR LOGICAL UNIT SHADOWING

(71) Applicant: Samsung Electronics Co., Ltd., Suwon-si, Gyeonggi-do (KR)

(72) Inventors: Yang Yu, San Jose, CA (US); Chang-Eun Choi, San Jose, CA (US); Kyung Ho Kim, Hwaseong-si (KR); Walter Jun, Hwaseong-si (KR); Wonchuri Zoo, Hwaseong-si (KR); Robert Brennan, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,375

(22) Filed: Oct. 5, 2017

(65) Prior Publication Data
US 2018/0032403 A1 Feb. 1, 2018

Related U.S. Application Data

(63) Continuation of application No. 14/663,220, filed on Mar. 19, 2015, now Pat. No. 9,823,972.
(Continued)

(51) Int. Cl.
*G06F 11/00* (2006.01)
*G06F 11/14* (2006.01)
(Continued)

(52) U.S. Cl.
CPC ...... *G06F 11/1417* (2013.01); *G06F 11/1004* (2013.01); *G06F 11/1666* (2013.01); *G06F 11/20* (2013.01)

(58) Field of Classification Search
CPC ... G06F 11/1417; G06F 11/1666; G06F 11/20
See application file for complete search history.

(56) References Cited

U.S. PATENT DOCUMENTS 5,537,540 A * 7/1996 Miller .................. G06F 21/565
714/36
5,568,641 A 10/1996 Nelson et al.
(Continued)

*Primary Examiner* — Bryce P Bonzo
*Assistant Examiner* — Jonathan D Gibson
(74) *Attorney, Agent, or Firm* — Renaissance IP Law Group LLP

(57) ABSTRACT

Embodiments of the inventive concept include computer-implemented method for shadowing one or more boot images of a mobile device. The technique can include duplicating boot images to shadow partitions in a user area of a non-volatile memory device such as a flash memory. The technique can include detecting boot image corruption, and causing a mobile device to boot from the shadow partitions. The technique can include dynamically shadowing and releasing blocks used by the shadow partitions. The technique can include boot failure recovery and bad image preservation through firmware flash translation layer (FTL) logical to physical mapping updates. Boot image corruption failures can be recovered from and/or debugged using the shadow partitions.

20 Claims, 7 Drawing Sheets

Related U.S. Application Data

(60) Provisional application No. 62/069,805, filed on Oct. 28, 2014.

(51) Int. Cl.
*G06F 11/16* (2006.01)
*G06F 11/10* (2006.01)
*G06F 11/20* (2006.01)

(56) References Cited

U.S. PATENT DOCUMENTS

| | | | |
|---|---|---|---|
| 5,579,522 A | 11/1996 | Christeson et al. | |
| 5,603,011 A | 2/1997 | Piazza | |
| 5,793,943 A | 8/1998 | Noll | |
| 5,805,882 A | 9/1998 | Cooper et al. | |
| 5,918,047 A * | 6/1999 | Leavitt | G06F 11/1417 713/2 |
| 7,340,638 B2 * | 3/2008 | Nicholson | G06F 11/0709 714/2 |
| 7,734,945 B1 | 6/2010 | Levidow et al. | |
| 7,886,190 B2 | 2/2011 | Rothman et al. | |
| 8,140,837 B2 | 3/2012 | Campbell et al. | |
| 2004/0153724 A1 * | 8/2004 | Nicholson | G06F 11/0709 714/6.11 |
| 2004/0199825 A1 | 10/2004 | Zeller et al. | |
| 2006/0069902 A1 * | 3/2006 | Rui | G06F 11/1469 713/1 |
| 2007/0033388 A1 | 2/2007 | Zhou et al. | |
| 2008/0270782 A1 * | 10/2008 | Bone | H04L 67/14 713/2 |
| 2009/0234897 A1 * | 9/2009 | Qi | G06F 12/023 |
| 2012/0084601 A1 | 4/2012 | Lee et al. | |
| 2014/0250295 A1 * | 9/2014 | Briden | G06F 12/0246 713/2 |

* cited by examiner

MOBILE FLASH STORAGE BOOT PARTITION AND/OR LOGICAL UNIT SHADOWING

RELATED APPLICATION DATA

This application is a continuation patent application of U.S. patent application Ser. No. 14/663,220, filed Mar. 19, 2015, which claims the benefit of U.S. Patent Application Ser. No. 62/069,805, filed Oct. 28, 2014, which is hereby incorporated by reference.

BACKGROUND

The present inventive concept relates to mobile devices, and more particularly, to a method for shadowing boot images of a mobile device.

Non-volatile memory (e.g., flash) storage is a crucial component of today's smartphones, tablets, ultra-books, wearable devices and other embedded and mobile devices. A "device-does-not-boot" issue comprises a very high percentage of the reasons why end users return their mobile device for repair or replacement, which can cause a significant negative user experience. Many of these device-does-not-boot symptoms are due to corruption of boot data in the flash storage device. Boot data corruption can be caused by many reasons such as a sudden power-loss, poor power subsystem design, software glitches, host system issues, inadvertent overwrite to the boot partition, unprotected data, or the like.

Conventionally, debugging of boot images is performed through USB capability that is enabled after the boot loader image gets executed. But in the conventional approach, if the boot images residing in boot partitions are corrupted, for example, due to sudden power loss events, poor system design, software glitches, and/or weakness of device firmware architecture, then the mobile devices will not boot and there is no easy method to reprogram the boot images, especially in the production version of the mobile devices, which conventionally have very limited debugging capability.

Most often it is time consuming and costly to repair these devices or debug the issues. Such problems impact not only the end users of these devices, but also the bottom line of the original manufacturer, component suppliers, and/or distribution partners. Embodiments of the present inventive concept address these and other limitations in the prior art.

BRIEF SUMMARY

Embodiments of the inventive concept include a computer-implemented method for shadowing one or more boot images of a mobile device. The method can include storing, in a section reserved for boot partitions in a first non-volatile memory of the mobile device, the one or more boot images. The method can include shadowing, by a shadow control logic section, the one or more boot images to one or more shadowed boot images in a section reserved for user partitions in a second non-volatile memory of the mobile device.

Embodiments of the inventive concept can include a computer-implemented method for shadowing one or more boot images of a mobile device. The method can include setting, by a host section of the mobile device, a first register indicating whether or not one or more boot images are constructed, and periodically entering, by a shadow control logic section, a shadow routine.

Embodiments of the inventive concept can include a mobile device. The mobile device can include a first non-volatile memory configured to store, in a section reserved for boot partitions, one or more boot images, a second non-volatile memory configured to store one or more user images in a section reserved for user partitions, and a shadow control logic section configured to shadow the one or more boot images from the first non-volatile memory to one or more shadowed boot images in the section reserved for the user partitions in the second non-volatile memory.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include a technique for duplicating boot images to shadow partitions in a user area of a non-volatile memory device such as a flash memory. The technique can include detecting boot image corruption, and causing a mobile device to boot from the shadow partitions. The technique can include dynamically shadowing and releasing blocks used by the shadow partitions. The technique can include boot failure recovery and bad image preservation through firmware flash translation layer (FTL) logical to physical mapping updates. Boot image corruption failures can be recovered from and/or debugged using the shadow partitions.

Figure 1:
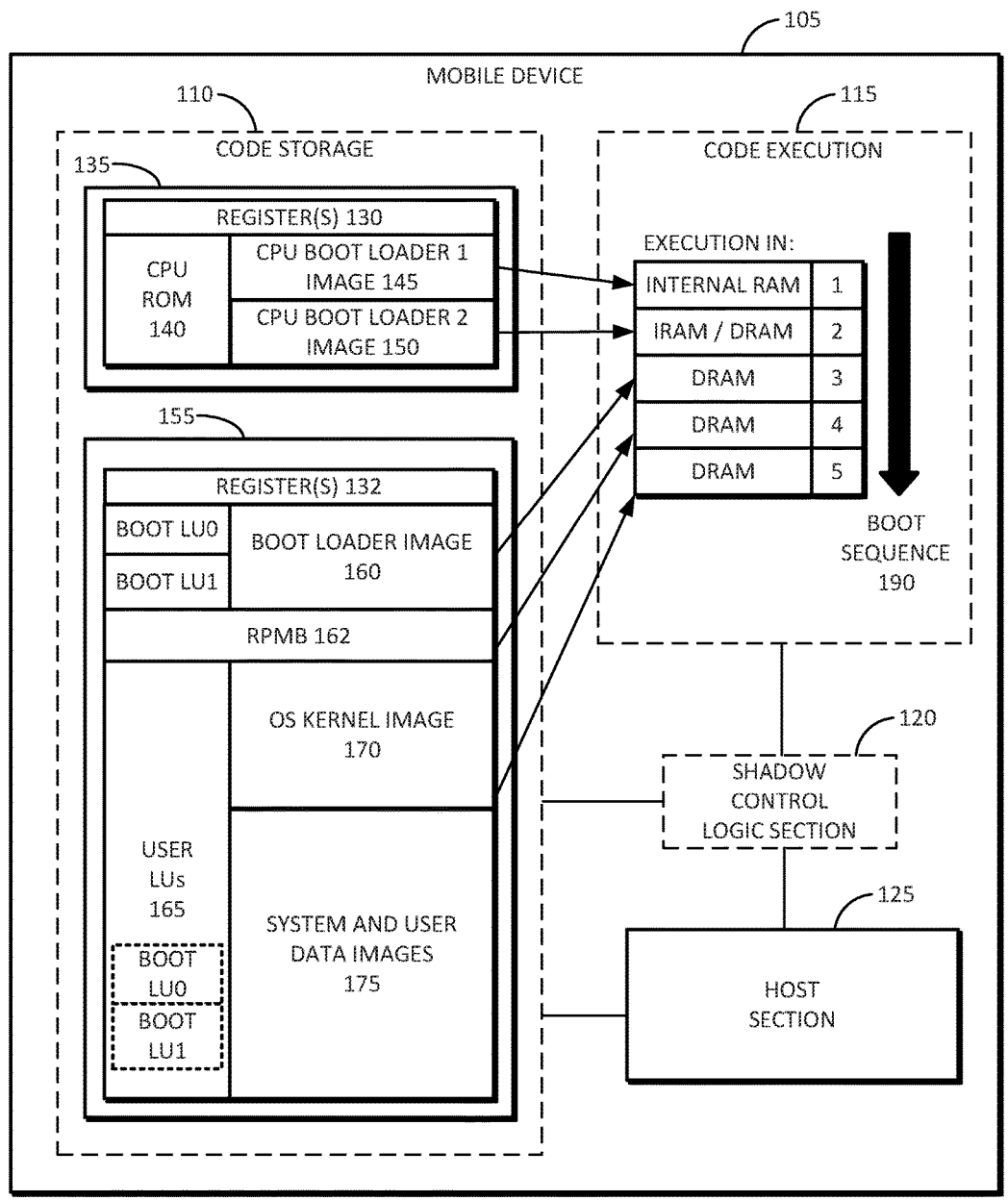
FIG. 1 is an example block diagram of a mobile device including shadow control logic section in accordance with embodiments of the inventive concept.

FIG. 1 is an example block diagram of a mobile device 105 including a shadow control logic section 120 in accordance with embodiments of the inventive concept. The mobile device 105 can include a code storage section 110, a host section 125, and the shadow control logic section 120. Although the shadow control logic section 120 is shown to be separate from the code storage section 110, it will be understood that the shadow control logic section 120 may be a part of the code storage section 110. For example, the shadow control logic section 120 can be firmware, hardware, or a combination thereof, residing in or on the non-volatile device 155 and/or a central processing unit (CPU) 135. A code execution block 115 shows an example boot sequence 190 of the mobile device 105. The CPU 135 can include registers 130 and a CPU read-only memory (ROM) 140. The ROM 140 can be a non-volatile memory. The CPU ROM 140 can include a CPU boot loader 1 image 145 and a CPU boot loader 2 image 150. In other words, the CPU ROM 140 can store one or more boot images in a section reserved for boot partitions.

The code storage section 110 can include a non-volatile memory 155. The non-volatile memory 155 can be a flash memory, magnetoresistive random access memory (MRAM) modules, phase-change memory (PRAM) modules, resistive type memory modules, or the like. The non-volatile memory 155 can store a boot loader image 160 including a boot logical unit 0 (LU0) and/or a boot LU1. The non-volatile memory 155 can include one or more registers 132. The non-volatile memory 155 can include a replay protected memory block (RPMB) 162. The non-volatile memory 155 can include a section for user LUs 165. The section for user LUs can include shadowed boot images such as boot LU0 and/or boot LU1, as further described in detail below. The non-volatile memory 155 can include an operating system (OS) kernel image 170, system and user data images 175, or the like.

The host section 125 can run host processes and applications. The host section 125 can be communicatively coupled to the code storage section 110 and/or to the shadow control logic section 120. For example, the host section 125 can access and/or update one or more registers 130 and/or 132. The shadow control logic section 120 can shadow one or more boot images (e.g., CPU boot loader 1 image 145 and/or CPU boot loader 2 image 150) to one or more shadowed boot images (e.g., boot LU0 and/or boot LU1) in the non-volatile memory (e.g., 155), as further described in detail below.

In a boot sequence 190 of the mobile device 105, there is a certain code execution that can occur in a particular order, as shown in the code execution 115. For example, the booting can start from the CPU internal ROM code execution when power to the mobile device 105 is turned on. Then, the booting can proceed to the boot partitions/LUs of the non-volatile component 155. More specifically, the CPU boot loader 1 image 145 can be loaded into internal random access memory (IRAM) at 1, the CPU boot loader 2 image 150 can be loaded into IRAM and/or dynamic random access memory (DRAM) at 2, the boot loader image 160 can be loaded into DRAM at 3, the OS kernel image 170 can be loaded into DRAM at 4, and the system and user data images 175 can be loaded into DRAM at 5.

Figure 2:
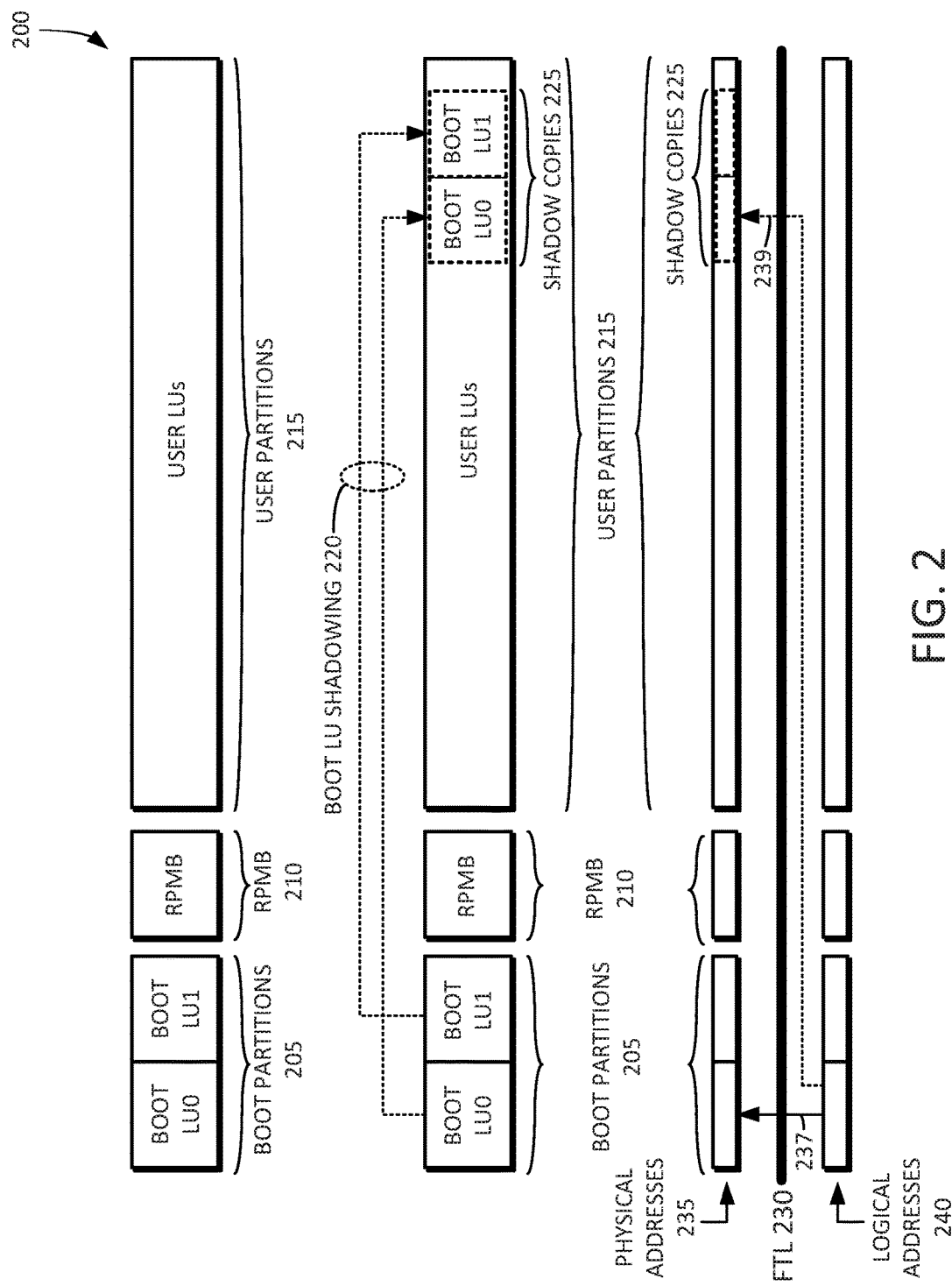
FIG. 2 is an example block diagram of boot partitions, user partitions, and shadow copies of boot partitions, in accordance with embodiments of the inventive concept.

FIG. 2 is an example block diagram 200 of boot partitions 205 (sometimes referred to herein as "boot images"), user partitions 215 (sometimes referred to herein as "user images"), RPMB 210, and shadow copies 225 of the boot images, in accordance with embodiments of the inventive concept. A boot LU shadowing routine (e.g., 220) may be periodically performed by the shadow control logic section (e.g., 120 of FIG. 1). The shadow control logic section 120 can shadow the one or more boot images 205 to one or more shadowed boot images 225, as further described in detail below.

The mobile device 105 can normally boot from the one or more boot images 205 as shown by arrow 237. In the event of corruption of the one or more boot images 205, the mobile device 105 can instead boot from the one or more shadow boot images 225 as shown by arrow 239. The shadow control logic section 120 can detect corruption within the one or more boot images 205, the technique of which is further described in detail below. Responsive to such a detection of corruption, the shadow control logic section 120 can cause the mobile device 105 to boot from the one or more shadowed boot images 225.

More specifically, a flash translation layer (FTL) 230 can update one or more pointers among the physical addresses 235 from the one or more boot images 205, respectively, to the one or more shadowed boot images 225. The host section (e.g., 125 of FIG. 1) interfaces with logical addresses 240, and therefore, such FTL manipulation of the physical addresses 235 can be hidden from the host section 125. As such, the shadow copies 225 can be invisible from the logical space 240 for data security purposes. Put differently, since shadow images 225 are invisible to the host, they are protected from external access. Since the FTL 230 can update the pointers to the shadow images 225 upon the detection of boot failure, the original boot images 205 can become inaccessible to the host section 125, which operates in the logical address space 240. The one or more corrupted images 205 can therefore be preserved for subsequent root causing and/or debugging efforts.

Figure 3:
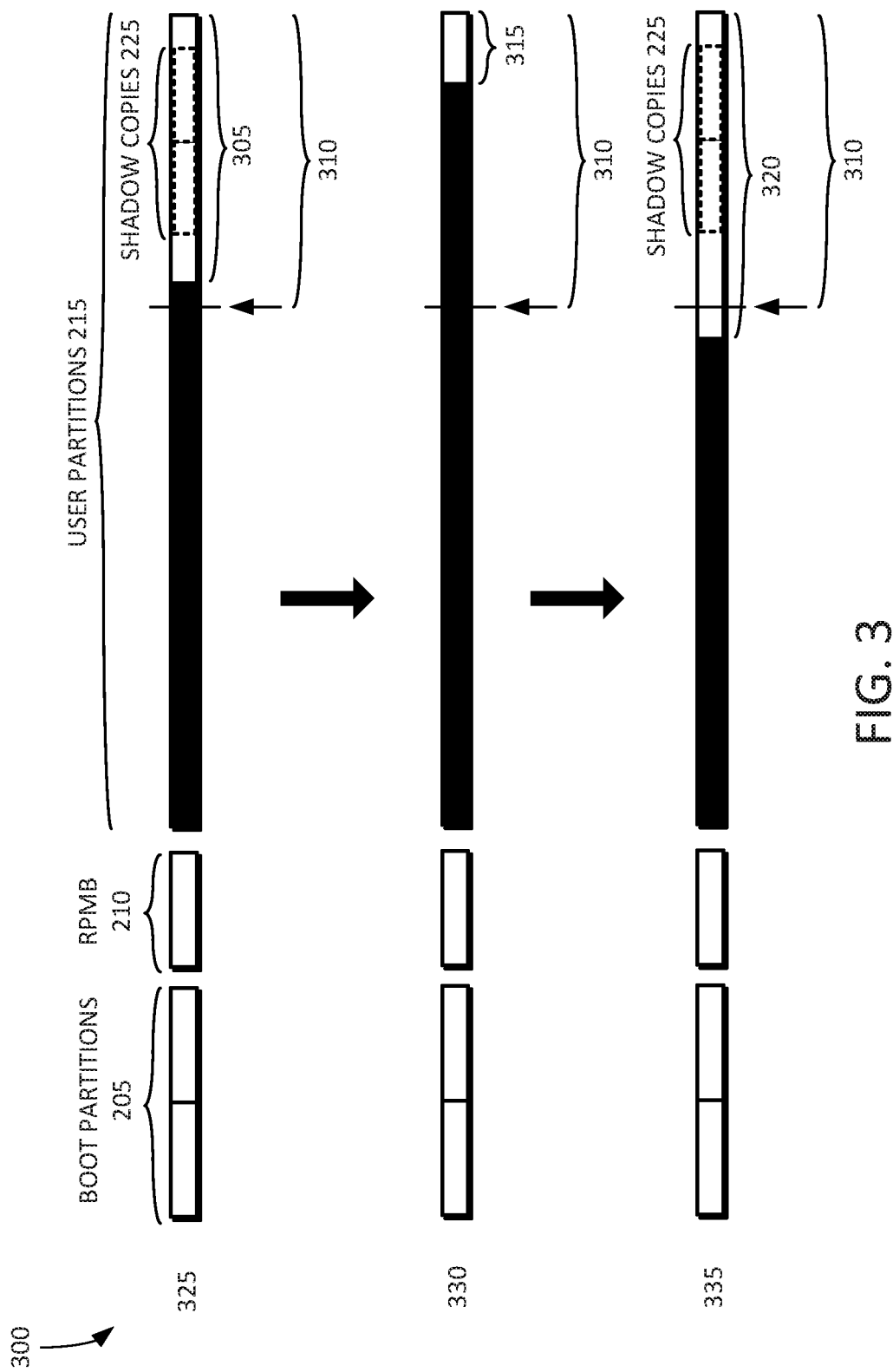
FIG. 3 is an example block and flow diagram illustrating a dynamic shadowing technique in accordance with embodiments of the inventive concept.

FIG. 3 is an example block and flow diagram 300 illustrating a dynamic shadowing technique in accordance with embodiments of the inventive concept. The shadow control logic section (e.g., 120 of FIG. 1), can detect an amount of available space 305 within the section reserved for the user partitions 215, and determine whether the amount of available space 305 is less than or equal to a predefined threshold 310 as shown at 325. When the determination is that the amount of available space 305 is less than or equal to the predefined threshold 310, the shadow control logic section 120 can cause the shadow boot image copies 225 to be marked as invalid and designated for garbage collection, and the space occupied by the shadow boot image copies 225 can be released to the section reserved for the user partitions 215 as shown at 330. As shown at 330, while the amount of available space 315 is less than the amount of available space 305, the overall space available for the user partitions 215 is increased. Thus, less impact to the usable density of the storage device for the user partitions is achieved.

When a determination is made that the amount of available space 320 is greater than the predefined threshold 310 as shown at 335, then the shadow control logic section 120 can again cause space to be allocated within the section reserved for the user partitions 215 for the one or more shadowed boot images 225. For example, when the device becomes less full (e.g., providing five times more density than total boot partition/LU size), the shadow control logic section 120 can automatically reenter the shadowing routine to duplicate the boot partitions to the user area. In other words, blocks within the section of the non-volatile memory 155 reserved for user partitions 215 can be dynamically released and reclaimed to accommodate the shadowing of the boot partitions.

Figure 4:
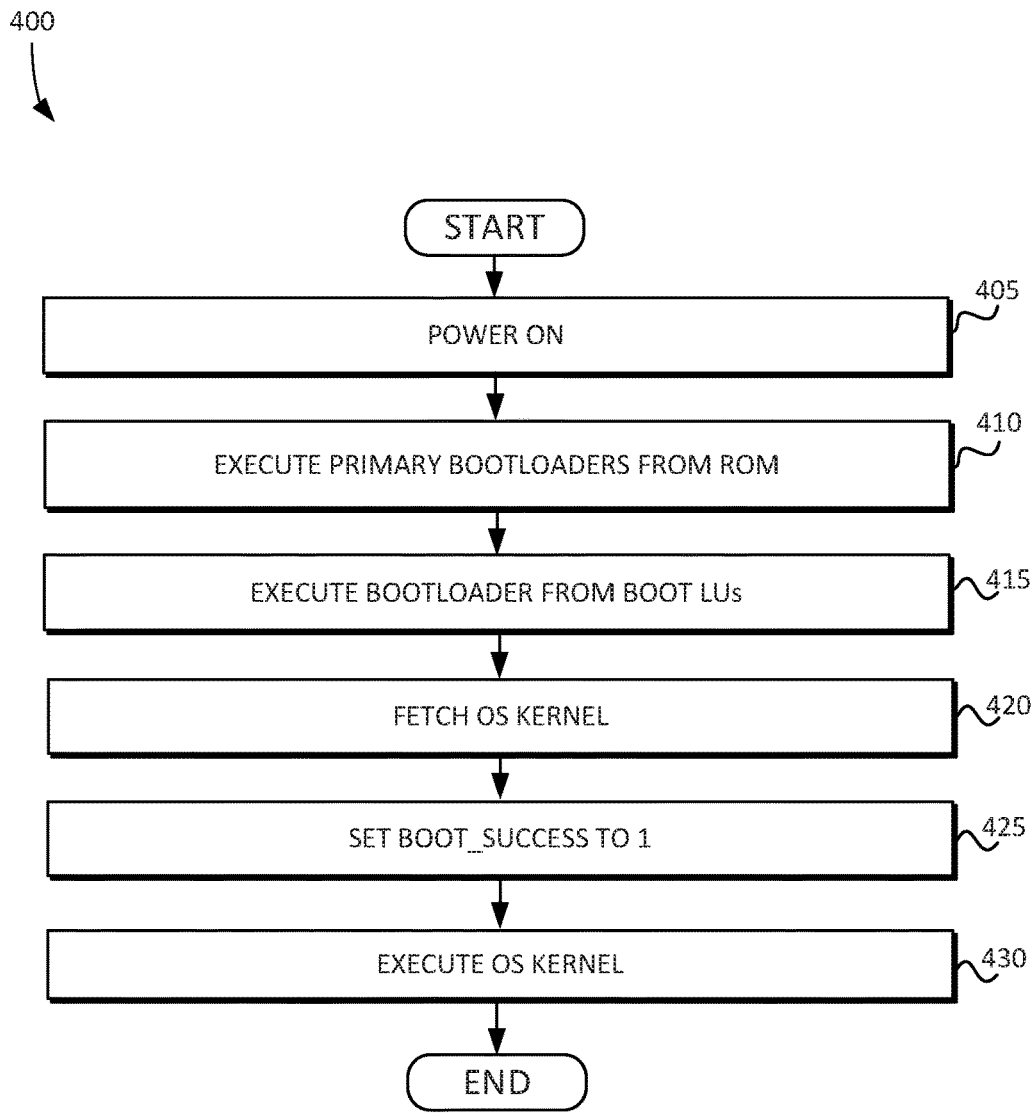
FIG. 4 is a flow diagram illustrating a technique for validating a boot image in accordance with embodiments of the inventive concept.

FIG. 4 is a flow diagram 400 illustrating a technique for validating a boot image in accordance with embodiments of the inventive concept. The technique begins at 405 where the mobile device (e.g., 105 of FIG. 1) is powered on. The host section (125 of FIG. 1) can cause the boot partitions to be loaded with bootloader images from ROM (e.g., 145 and 150 of FIG. 1) and execute the primary boot loader images at 410 after the system powers on. At 415, the host section 125 can execute the bootloader from boot LUs (e.g., the one or more boot images 205 of FIG. 2). The flow proceeds to 420 where the host section 125 can fetch the OS kernel.

At 425, when both the bootloader phase and the OS kernel fetching phase are successfully passed, the host section 125 can set the BOOT_SUCCESS register (e.g., 130 and/or 132 of FIG. 1) to a predefined value, such as 1, indicating that the boot images (e.g., 205) are constructed and proven good. The BOOT_SUCCESS register can be reset, for example, to a value of 0 at the time of powering on the mobile device 105. The BOOT_SUCCESS register can be accessed by the shadow control logic section (120 of FIG. 1), as further describe below. It will be understood that the BOOT_SUCCESS register can be set to different or other suitable values to differentiate the two different states. It will also be understood that rather than a register, the BOOT_SUCCESS can be a variable stored in any suitable memory location. The BOOT_SUCCESS register allows the known good data in the boot images 205 to be preserved in the shadow images 225, as also further described below. The BOOT_SUCCESS register can indicate a validation of the images in the boot partitions, so that shadow control logic section 120 can start the shadowing process, if not completely shadowed already. At 430, the host section 125 can execute the OS kernel.

Figure 5:
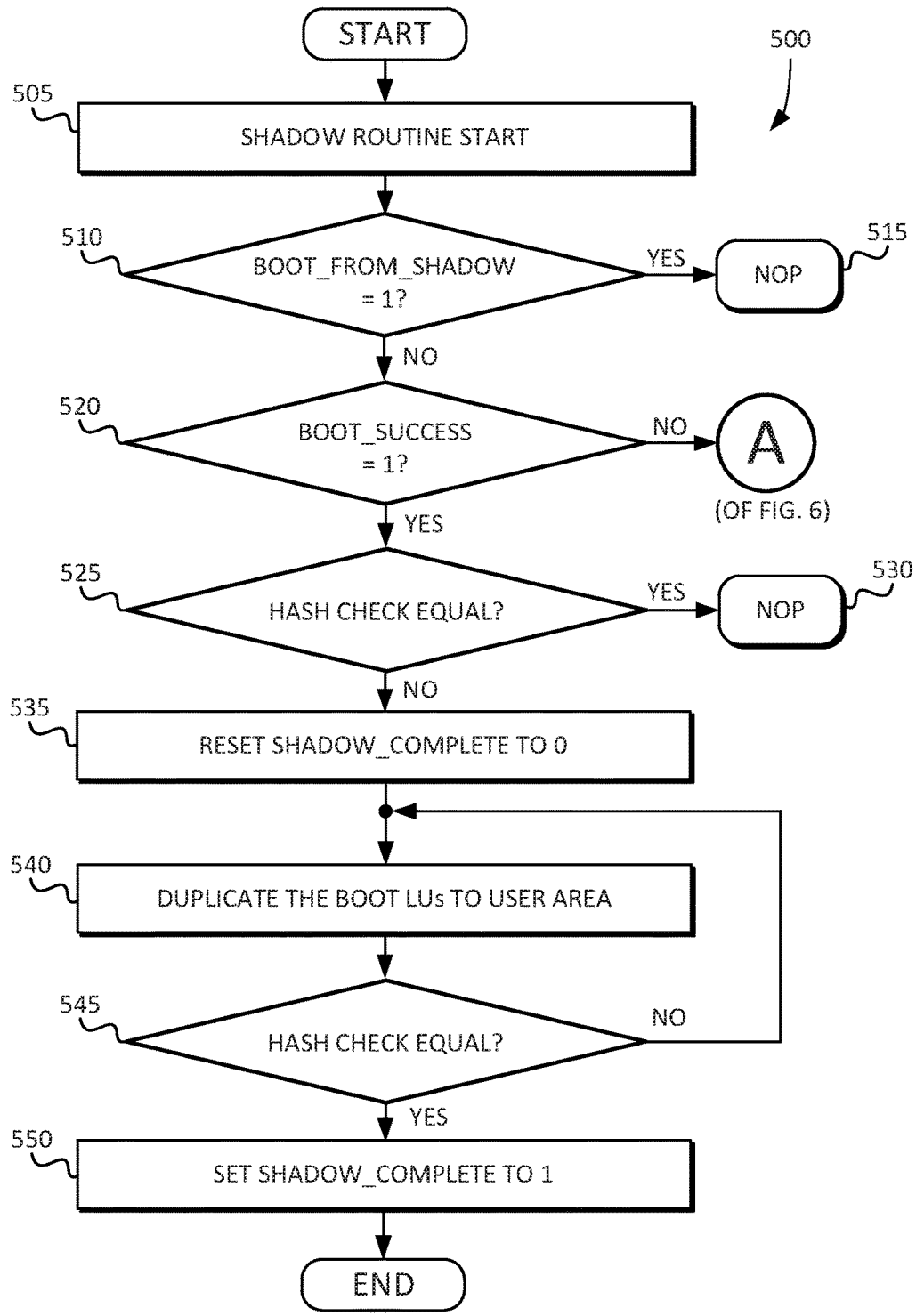
FIG. 5 is a flow diagram illustrating a technique for shadowing one or more boot images in accordance with embodiments of the inventive concept.

FIG. 5 is a flow diagram 500 illustrating a technique for shadowing one or more boot images in accordance with embodiments of the inventive concept. At 505, the shadow routine can start. The shadow control logic section (120 of FIG. 1) can cause the shadow routine to be periodically entered. If certain conditions are met, the shadow control logic section can cause the one or more boot partitions (e.g., 205 of FIG. 2) to be shadowed to one or more shadow partitions (e.g., 225 of FIG. 2) so that the boot partitions and the shadow partitions have the same images. The shadow routine can be entered when the mobile device 105 is in an idle mode or is otherwise substantially idle. In other words, the shadowing can include yielding to higher priority tasks while the shadowing occurs in the background.

At 510, at about a start time of the shadow routine, a determination can be made whether or not a BOOT_FROM_SHADOW register (e.g., 130 and/or 132 of FIG. 1) is equal to a predefined value such as 1. The value can indicate that the mobile device 105 should boot from the one or more shadowed boot images 225 or will boot from the one or more shadowed images 225, and in such case, the shadow routine is not continued and ends in a no-operation (NOP) 515. The value of 0 can indicate that the mobile device 105 should not boot from the one or more shadowed boot images 225, and in such case, the shadow routine can continue and the flow can proceed to 520. It will be understood that the BOOT_FROM_SHADOW register can be set to different or other suitable values to differentiate the two different states. It will also be understood that rather than a register, the BOOT_FROM_SHADOW can be a variable stored in any suitable memory location.

At 520, another determination can be made whether the BOOT_SUCCESS register (e.g., of FIG. 4) indicates that the one or more boot images (e.g., 205 of FIG. 2) are constructed or otherwise known to be good. If the BOOT_SUCCESS register is equal to 1, for example, then the routine can proceed to 525. Otherwise, if the BOOT_SUCCESS register is equal to 0, meaning that the mobile device 105 did not successfully boot, then the routine can proceed to 'A' of FIG. 6, as further described below.

At 525, another determination can be made whether a hash check is equal. More specifically, the shadow control logic section (e.g., 120 of FIG. 1) can compare a hash of the one or more boot images 205 with a hash of the one or more shadowed boot images 225. Responsive to a match in the comparison of the first and second hashes, this indicates that the one or more shadowed boot images 225 are equivalent to the one or more boot images 205, and the routine can end with a NOP 530. In other words, if the routine ends with the NOP 530, it means that the shadow images have already been constructed. Conversely, responsive to a mismatch in the comparison of the first and second hashes, the routine can continue to 535 where a SHADOW_COMPLETE register can be set to a predefined value such as 0, meaning that the one or more shadowed images 225 are not yet complete copies of the one or more boot images 205. It will be understood that the SHADOW_COMPLETE register can be set to different or other suitable values to differentiate two different states. It will also be understood that rather than a register, the SHADOW_COMPLETE can be a variable stored in any suitable memory location.

The flow can proceed to 540, where the one or more boot images 205 can be duplicated to the one or more shadowed boot images 225 in the user area section reserved for user LUs. The duplication can be performed in an incremental manner so as to not impact the performance of the mobile device 105. At 545, another determination can be made whether a hash check is equal. Such a determination can be the same or similar determination made with reference to 525, and therefore, a detailed description is not repeated. If it is determined that the hash check is not equal, it is likely that the shadowing did not succeed and/or that the shadowed images are invalid and need to be reconstructed, and therefore, the flow can return to 540 for additional duplication of the boot LUs to the user area. Otherwise, if it is determined that the hash check is equal, the flow proceeds to 550, where the SHADOW_COMPLETE register is set to 1. This indicates that the shadowing process has completed. The host section (125 of FIG. 1) can know the status (i.e., shadowed or not shadowed) by reading the SHADOW_COMPLETE status register. The hash codes of the one or more boot images can be stored and used for data comparison and error checking.

The shadow control logic section (120 of FIG. 1) can allocate physical areas in the user partition as shadowing partitions. The total size of these areas can be equal to the total size of boot partitions (e.g., boot LUs). The shadow control logic section 120 can optionally configure the one or more shadowed boot images into single-level cell (SLC) mode for performance and reliability improvements. The shadow control logic section 120 can read data from the boot partitions and write the data to the shadowed boot images stored in the user partition during device idle time. The shadow control logic section 120 can keep track of the progress if the shadowing process is interrupted by a host command, which might bring the mobile device 105 out from the idle state. When the mobile device 105 enters the idle state again, the shadow control logic section 120 can resume the shadowing process until it is completed. Subsequently, the shadow control logic section 120 can perform the hash checking and set the SHADOW_COMPLETE register to 1 to indicate that the shadowing process is completed. The physical location of the blocks for shadow partitions need not be fixed. The shadow control logic section 120 can keep track of the physical locations of the blocks of the shadow partitions.

It will be understood that the steps illustrated in FIG. 5 need not occur in the illustrated order, but rather, can occur in a different order and/or with intervening steps.

Figure 6:
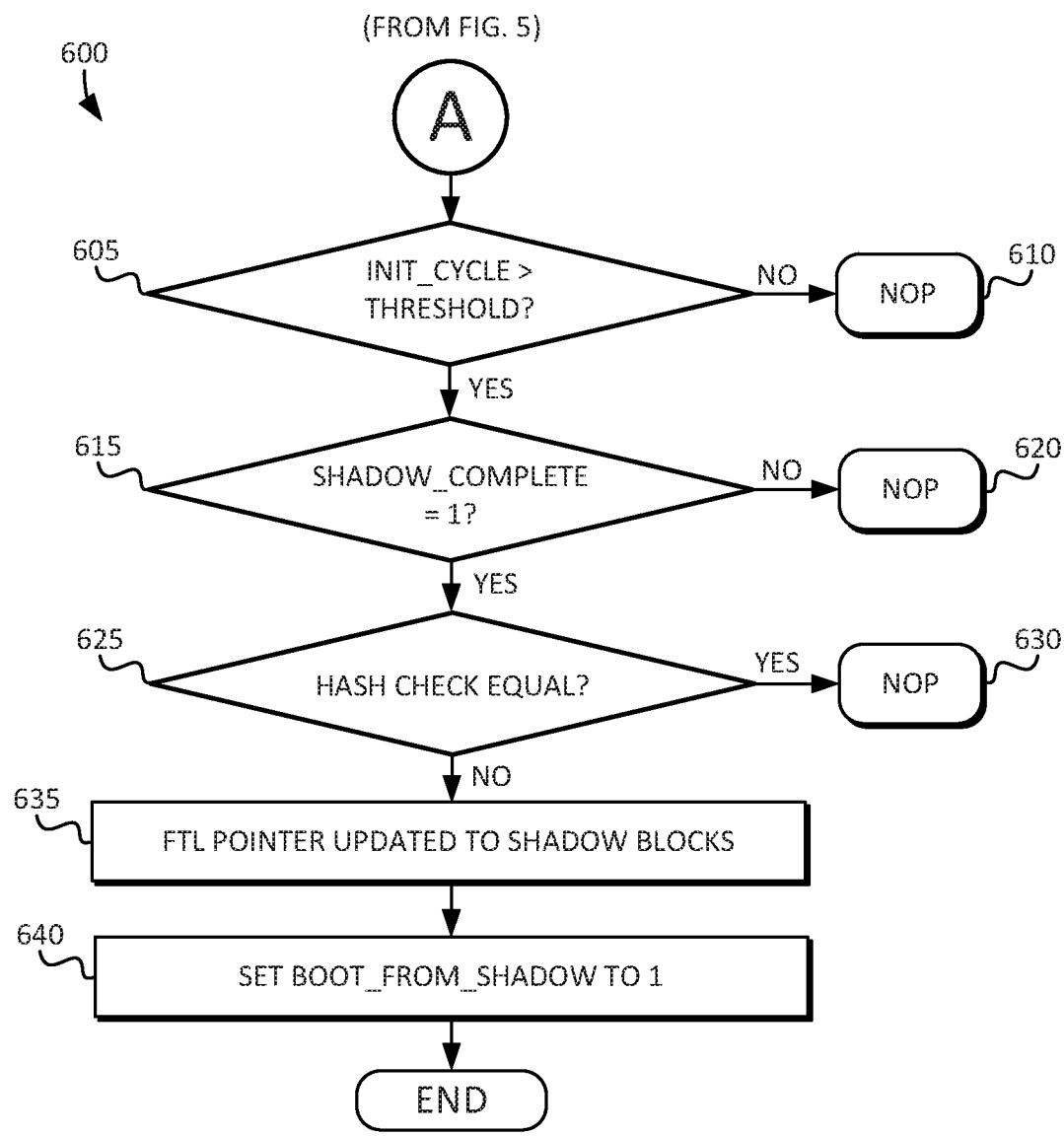
FIG. 6 is a continuation of the flow diagram of FIG. 5, illustrating a technique for detecting a boot failure in accordance with embodiments of the inventive concept.

FIG. 6 is a continuation flow diagram 600 of the flow diagram 500 of FIG. 5, illustrating a technique for detecting a boot failure in accordance with embodiments of the inventive concept. During the booting process of the mobile device 105, the primary boot loaders (e.g., 145 and 150 of FIG. 1) in the CPU ROM (e.g., 140 of FIG. 1) get executed first. The primary boot loaders can cause initialization command sequences to be sent to the non-volatile memory (e.g., 155 of FIG. 1) through the host section (e.g., 125 of FIG. 1). When the BOOT_SUCCESS register is set to 1, for example, the shadow control logic section (e.g., 120 of FIG. 1) can assume that the boot images (e.g., 205 of FIG. 2) in the boot partitions are good, and therefore, the boot images can be duplicated to the shadowed boot images in the dynamic shadowing process.

When the BOOT_SUCCESS register has a value of 0, for example, the shadow control logic section 120 can keep an INIT_CYCLE internal counter to keep track of the total number of host issued initialization requests. The INIT_CYCLE counter can be cleared to a value of 0 when the BOOT_SUCCESS register is changed from a value of 0 to a value of 1.

Responsive to determining that the BOOT_SUCCESS register indicates that the one or more boot images are not constructed (e.g., at 520 of FIG. 5), the shadow routine can proceed to 605 of FIG. 6, where the shadow control logic 120 can count a number of initialization requests from the host section 125 of the mobile device 105. The shadow control logic 120 can determine whether the number of initialization requests exceeds a predefined threshold (e.g., 20).

If the number of initialization requests does not exceed the predefined threshold, the routine can end in a NOP 610, meaning that the initialization cycle condition is not met, and the host section 125 needs to conduct more booting retries. On the other hand, responsive to determining that the number of initialization requests exceeds the predefine threshold, the shadow control logic 120 can determine at 615 whether the SHADOW_COMPLETE register indicates that the one or more boot images (e.g., 205 of FIG. 2) are completely shadowed to the one or more shadowed boot images (e.g., 225 of FIG. 2) at 625.

If the SHADOW_COMPLETE register is not 1 (e.g., 0), then the routine can end in a NOP 620, meaning that the shadowing process was not properly completed before the mobile device 105 failed to boot. Otherwise, responsive to determining that the second register indicates that the one or more boot images are completely shadowed to the one or more shadowed boot images (i.e., SHADOW_COMPLETE=1), the shadow control logic section 120 can compare a first hash of the one or more boot images (e.g., 205 of FIG. 2) with a second hash of the one or more shadowed boot images (e.g., 225 of FIG. 2).

In other words, when the shadow control logic section 120 determines that the total number of initialization requests from the host section 125 is larger than the predefined threshold (e.g., 20), the shadow control logic section 120 can conduct a hash checking process to compare the hash of the current boot partition images with the copied images in the shadow partitions. The period of such hash checking process can depend on an 'X' number setting, which can be programmable for or by the host section 125 through a hash checking period register on the mobile device 105. The mobile device 105 can have a default value for the hash checking period of 20, for example.

If the shadow control logic section 120 finds at 625 a hash code mismatch, which can mean boot partition (e.g., LU) image corruption, then the high number of host initialization retries can be root-caused to be boot image corruption. Such a failure can be detected automatically. The shadow control logic section 120 can cause the FTL (e.g., 230 of FIG. 2) to update at 635 the logical address pointers of the one or more boot partitions from the physical boot areas to the shadowed partitions, then set at 640, the BOOT_FROM_SHADOW register to 1, for example, to notify the host section 125. The next boot will therefore boot from the one or more shadow partitions in the user area.

The host section 125 can check the BOOT_FROM_SHADOW register in the OS after booting from the shadow partitions, and optionally display a message for the user informing the user of the action taken. Otherwise, if the shadow control logic section 120 finds at 625 that the hash check is equal (i.e., that the hashes are equal), then the routine can end in the NOP 630, meaning that although the booting failed, corruption was not necessarily found in the boot partitions since the hashes match.

Put differently, responsive to a mismatch at 625 in the comparison of a hash of the one or more boot images with a hash of the one or more shadowed boot images, the shadow control logic section 120 can infer that the one or more boot images are corrupted. At 635, the FTL can update one or more pointers from the one or more boot images, respectively, to the one or more shadowed boot images. At 640, the shadow control logic section 120 can set the BOOT_FROM_SHADOW register to a predefined value such as 1, indicating that the mobile device 105 should boot from the one or more shadowed boot images.

It will be understood that the steps illustrated in FIG. 6 need not occur in the illustrated order, but rather, can occur in a different order and/or with intervening steps.

The following table 1 is provided to assist in the understanding of the various registers described herein.

TABLE 1

| Register Name | Type | Type Description | Usage |
| --- | --- | --- | --- |
| BOOT_SUCCESS | R/W/CP | This register can be writeable after its value is cleared by a power failure and/or hardware reset. In some embodiments, this register is not cleared by a software reset. This register can also be readable. | Host section can set this register after every successful booting cycle. This register can be reset automatically (e.g., by firmware) at every device power on. |
| SHADOW_COMPLETE | R/W/E | This register can be multiple writable with its value kept after a power failure, hardware reset, and/or any software reset. This register can also be readable. | This register can be a status register to inform the host section and/or the device firmware of the completion of the shadowing process. |
| BOOT_FROM_SHADOW | R/W/E | This register can be multiple writable with its value kept after a power failure, hardware reset, and/or any software reset. This register can also be readable. | This register can be a status register to inform the host section and/or device firmware that the current and next boot will be from the one or more shadowed partitions. |

Figure 7:
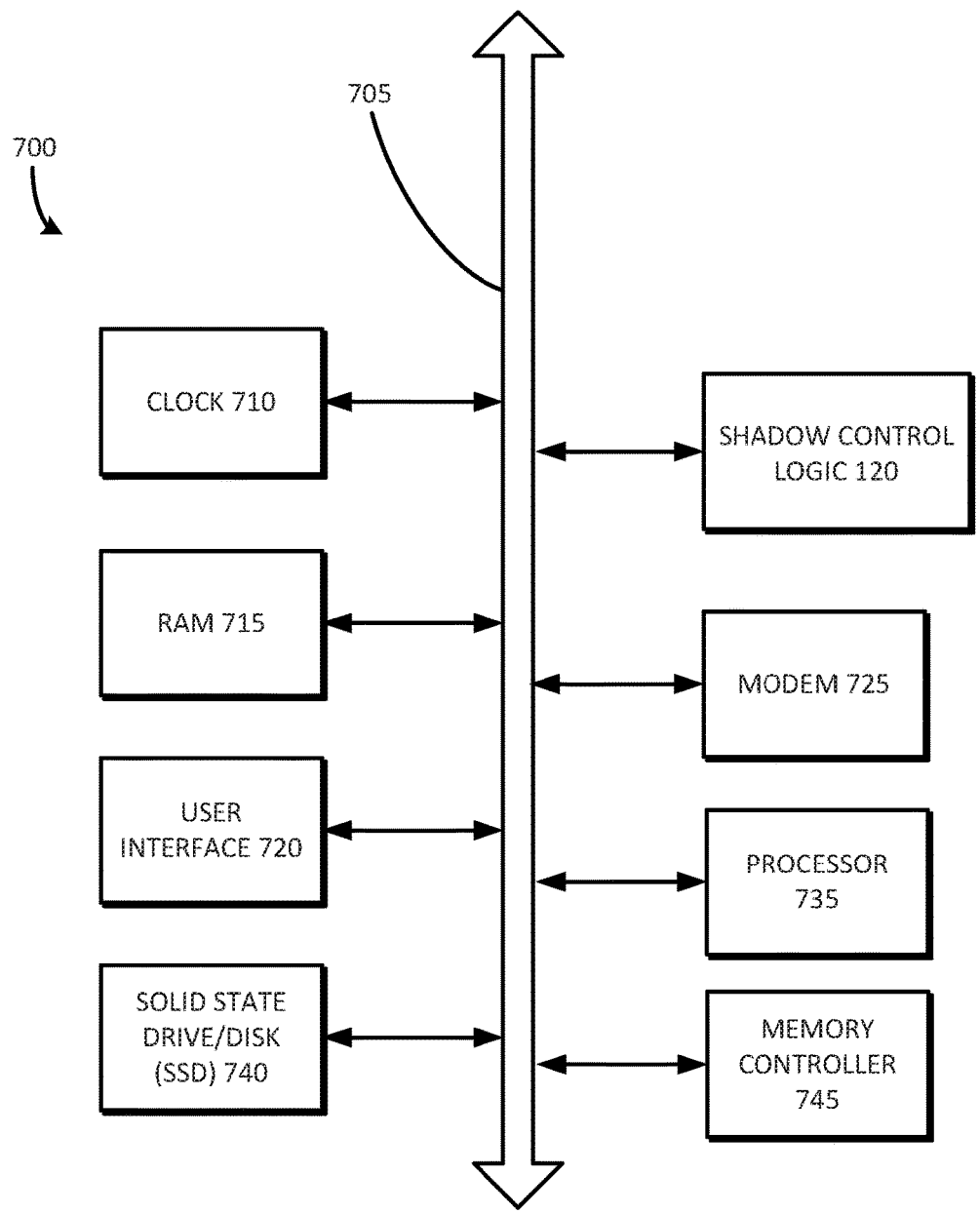
FIG. 7 is a block diagram of a computing system including the shadow control logic section of FIG. 1.

FIG. 7 is a block diagram of a computing system 700 including the shadow control logic section 120 of FIG. 1.

Referring to FIG. 7, the computing system 700 may include a clock 710, a random access memory (RAM) 715, a user interface 720, a modem 725 such as a baseband chipset, a solid state drive/disk (SSD) 740, a memory controller 745, and/or a processor 735, any or all of which may be electrically coupled to a system bus 705. The shadow control logic section 120 can correspond to that described in detail above, and as set forth herein, and may also be electrically coupled to the system bus 705. The shadow control logic section 730 can include or otherwise interface with the clock 710, the random access memory (RAM) 715, the user interface 720, the modem 725, the solid state drive/disk (SSD) 740, the memory controller 745, and/or the processor 735.

Accordingly, when a "device-does-not-boot" issue is caused by boot code image corruption in the boot logical units (e.g., boot partitions), embodiments of the inventive concept can help the mobile device to recover from this failure. According to embodiments of the inventive concept, the firmware of a non-volatile memory (e.g., flash storage device) can automatically duplicate the contents of boot logical units (e.g., boot partitions) into the user logical units (e.g., user partition) through firmware internal data moving operations in the physical address space. The duplicated copies of the boot images can have the same hash data as the original images residing in the boot logical units. This hash data can be kept for error checking. The duplicated copies in the user partition can be called shadow partitions.

In the event of code corruption in the boot partitions, thereby causing the "device-does-not-boot" issue, the firmware can automatically detect the failure based on the number of continuous initialization retry requests issued by the host. Such retry threshold can be configurable by the host, and can have a default value. Once the failure detection criteria and threshold are met, the firmware FTL layer can automatically update the logical to physical address table of the boot partitions, pointing to the shadow partitions in the user area which contains the valid copies of the original boot code images.

Therefore, when the mobile device attempts to boot again, the boot code data can be fetched from the shadow partitions for the host. Since the host operates in the logical address space and the firmware FTL layer handles the pointer update internally in the non-volatile memory storage device, the underlying aspects of the inventive concept are relatively invisible to the host hardware and software. The failing conditions can be preserved for root causing and debugging purposes.

The various embodiments of the inventive concept disclosed herein can be implemented with minimal host software involvement. Variable sizes of the boot partitions/LUs can be supported, for example, as large as hundreds of megabytes or more. In some embodiments, the shadow control logic section can shadow the OS kernel if it is placed in the boot LU. There is little to no performance impact since incremental duplication can be performed in the background and/or during device idle times. Moreover, there is no density loss since the shadowing is dynamic and can be released when the device is full.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A computer-implemented method for shadowing one or more boot images of a mobile device, the method comprising:

storing, in a section reserved for boot partitions in a first non-volatile memory of the mobile device, the one or more boot images; and shadowing, by a shadow control logic section, the one or more boot images to one or more shadowed boot images in a section reserved for user partitions in a second non-volatile memory of the mobile device; and booting from the one or more shadowed boot images in the section reserved for user partitions.

2. The computer-implemented method of claim 1, further comprising:

detecting, by the shadow control logic section, corruption within the one or more boot images; and responsive to the detection, causing the mobile device to boot from the one or more shadowed boot images.

3. The computer-implemented method of claim 2, wherein causing the mobile device to boot from the one or more shadowed boot images further comprises:

updating, by a flash translation layer, one or more pointers from the one or more boot images, respectively, to the one or more shadowed boot images.

4. The computer-implemented method of claim 2, wherein causing the mobile device to boot from the one or more shadowed boot images further comprises:

preserving the one or more boot images having the corruption for at least one of subsequent root causing or debugging.

5. The computer-implemented method of claim 4, wherein:

preserving the one or more boot images further includes causing the one or more boot images to become inaccessible to a host section of the mobile device that operates in a logical address space;

the method further comprising updating one or more pointers in a physical address space from the one or more boot images, respectively, to the one or more shadowed boot images.

6. The computer-implemented method of claim 1, further comprising:

detecting, by the shadow control logic section, an amount of available space within the section reserved for the user partitions; and determining whether the amount of available space is less than or equal to a predefined threshold.

7. The computer-implemented method of claim 6, further comprising:

responsive to determining that the amount of available space is less than or equal to the predefined threshold:
  garbage collecting the one or more shadowed boot images; and
  releasing space occupied by the one or more shadowed boot images to the section reserved for the user partitions in the second non-volatile memory.

8. The computer-implemented method of claim 6, further comprising:

responsive to determining that the amount of available space is greater than the predefined threshold:
  allocating space within the section reserved for the user partitions for the one or more shadowed boot images; and
  shadowing, by the shadow control logic section, the one or more boot images from the first non-volatile memory to the one or more shadowed boot images in the section reserved for the user partitions in the second non-volatile memory.

9. The computer-implemented method of claim 1, further comprising:

setting, by a host section of the mobile device, a first register indicating whether or not the one or more boot images are constructed;

periodically entering, by the shadow control logic section, a shadow routine;

responsive to determining that the first register indicates that the one or more boot images are not constructed:
  counting, by the shadow control logic section, a number of initialization requests from the host section of the mobile device;
  determining, by the shadow control logic section, whether the number of initialization requests exceeds a predefined threshold;
  responsive to determining that the number of initialization requests exceeds the predefine threshold, determining whether a second register indicates that the one or more boot images are completely shadowed to one or more shadowed boot images; and
  responsive to determining that the second register indicates that the one or more boot images are completely shadowed to the one or more shadowed boot images, comparing a first hash of the one or more boot images with a second hash of the one or more shadowed boot images; and responsive to determining that the first register indicates that the one or more boot images are constructed:
  shadowing, by the shadow control logic section, the one or more boot images to the one or more shadowed boot images; and
  setting, by the shadow control logic section, the second register indicating whether or not the one or more boot images are completely shadowed to the one or more shadowed boot images.

10. A computer-implemented method for shadowing one or more boot images of a mobile device, the method comprising:
  setting, by a host section of the mobile device, a first register indicating whether or not one or more boot images are constructed;
  periodically entering, by a shadow control logic section, a shadow routine; and
  responsive to determining that the first register indicates that the one or more boot images are not constructed:
    counting, by the shadow control logic section, a number of initialization requests from the host section of the mobile device;
    determining, by the shadow control logic section, whether the number of initialization requests exceeds a predefined threshold; and
    responsive to determining that the number of initialization requests exceeds the predefine threshold, determining whether a second register indicates that the one or more boot images are completely shadowed to one or more shadowed boot images.

11. The computer-implemented method of claim 10, wherein the shadow routine further comprises:
  responsive to determining that the first register indicates that the one or more boot images are not constructed:
    responsive to determining that the second register indicates that the one or more boot images are completely shadowed to the one or more shadowed boot images, comparing a first hash of the one or more boot images with a second hash of the one or more shadowed boot images; and
  responsive to determining that the first register indicates that the one or more boot images are constructed:
    shadowing, by the shadow control logic section, the one or more boot images to the one or more shadowed boot images, wherein the shadowing includes yielding to higher priority tasks while the shadowing occurs in the background.

12. The computer-implemented method of claim 10, wherein responsive to determining that the first register indicates that the one or more boot images are constructed:
  setting, by the shadow control logic section, the second register indicating whether or not the one or more boot images are completely shadowed to the one or more shadowed boot images.

13. The computer-implemented method of claim 11, wherein the shadow routine further comprises:
  responsive to a mismatch in the comparison of the first and second hashes:
    updating, by a flash translation layer, one or more pointers from the one or more boot images, respectively, to the one or more shadowed boot images; and
    setting, by the shadow control logic section, a third register indicating that the mobile device should boot from the one or more shadowed boot images.

14. The computer-implemented method of claim 13, wherein the shadow routine further comprises:
  determining at about a start time of the shadow routine whether or not the third register indicates that the mobile device should boot from the one or more shadowed boot images;
  responsive to determining that the third register indicates that the mobile device should not boot from the one or more shadowed boot images, continuing with the shadow routine; and
  responsive to determining that the third register indicates that the mobile device should boot from the one or more shadowed boot images, not continuing with the shadow routine.

15. A mobile device, comprising:
  a first non-volatile memory configured to store, in a section reserved for boot partitions, one or more boot images;
  a second non-volatile memory configured to store one or more user images in a section reserved for user partitions; and
  a shadow control logic section configured to:
    shadow the one or more boot images from the first non-volatile memory to one or more shadowed boot images in the section reserved for the user partitions in the second non-volatile memory; and
    cause the mobile device to boot from the one or more shadowed boot images in the section reserved for user partitions.

16. The mobile device of claim 15, wherein:
  the shadow control logic section is configured to detect corruption within the one or more boot images; and
  responsive to the detection, the shadow control logic section is configured to cause the mobile device to boot from the one or more shadowed boot images,
  wherein a host section of the mobile device is configured to set a first register indicating whether or not the one or more boot images are constructed;
  wherein the shadow control logic section is configured to:
    periodically enter a shadow routine; and
    responsive to determining that the first register indicates that the one or more boot images are not constructed:
      count a number of initialization requests from the host section of the mobile device;

determine whether the number of initialization requests exceeds a predefined threshold;

responsive to determining that the number of initialization requests exceeds the predefine threshold, determine whether a second register indicates that the one or more boot images are completely shadowed to one or more shadowed boot images; and responsive to determining that the second register indicates that the one or more boot images are completely shadowed to the one or more shadowed boot images, compare a first hash of the one or more boot images with a second hash of the one or more shadowed boot images.

17. The mobile device of claim 16, further comprising:

a flash translation layer configured to update one or more pointers from the one or more boot images, respectively, to the one or more shadowed boot images, and to preserve the one or more boot images having the corruption, wherein responsive to determining that the first register indicates that the one or more boot images are constructed:

shadow, by the shadow control logic section, the one or more boot images to the one or more shadowed boot images; and set, by the shadow control logic section, the second register indicating whether or not the one or more boot images are completely shadowed to the one or more shadowed boot images.

18. The mobile device of claim 15, wherein:

the shadow control logic section is configured to detect an amount of available space within the section reserved for the user partitions, and to determine whether the amount of available space is less than or equal to a predefined threshold.

19. The mobile device of claim 18, wherein:

responsive to the determination that the amount of available space is less than or equal to the predefined threshold, the shadow control logic section is configured to:

garbage collect the one or more shadowed boot images; and release space occupied by the one or more shadowed boot images to the section reserved for the user partitions in the second non-volatile memory.

20. The mobile device of claim 18, wherein:

responsive to the determination that the amount of available space is greater than the predefined threshold, the shadow control logic section is configured to:

allocate space within the section reserved for the user partitions for the one or more shadowed boot images; and shadow the one or more boot images from the first non-volatile memory to the one or more shadowed boot images in the section reserved for the user partitions in the second non-volatile memory.

* * * * *